Aug. 27, 1968     M. B. LEISING ETAL     3,398,524
ROTARY ENGINE WITH AFTERBURNER
Filed Jan. 27, 1967     4 Sheets-Sheet 2

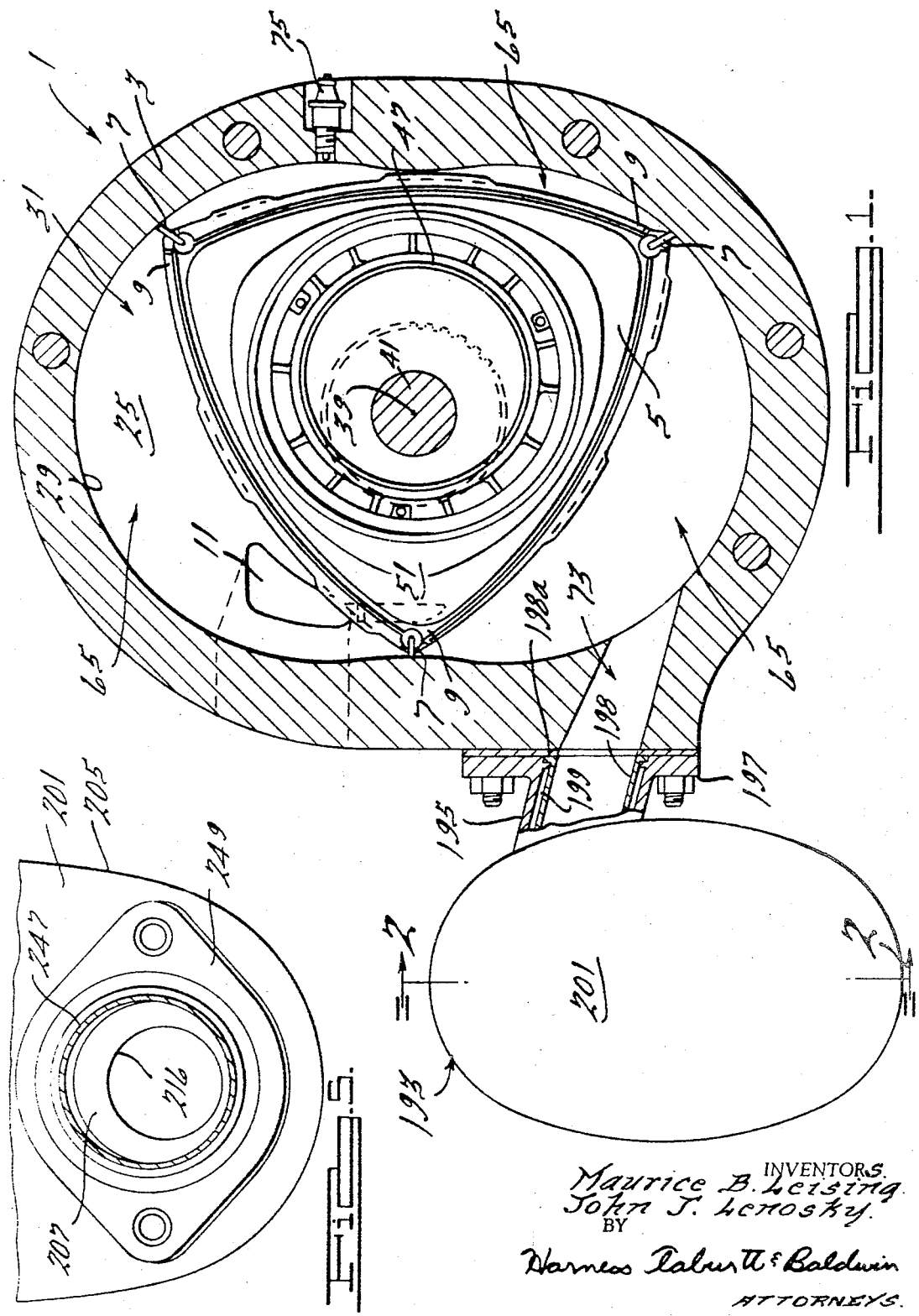

INVENTORS.
Maurice B. Leising
John J. Lenosky
BY
Harness Dalbert & Baldwin
ATTORNEYS.

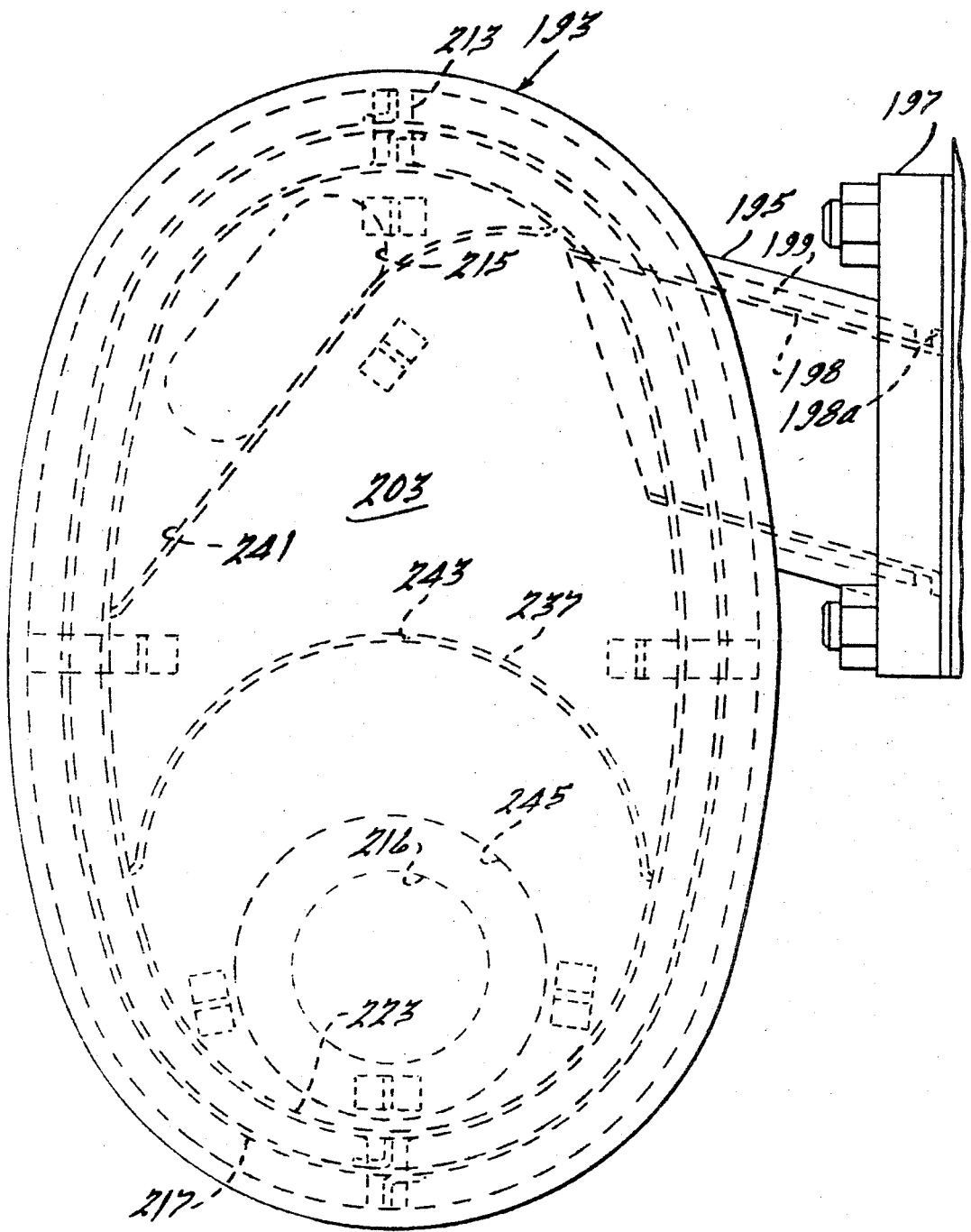

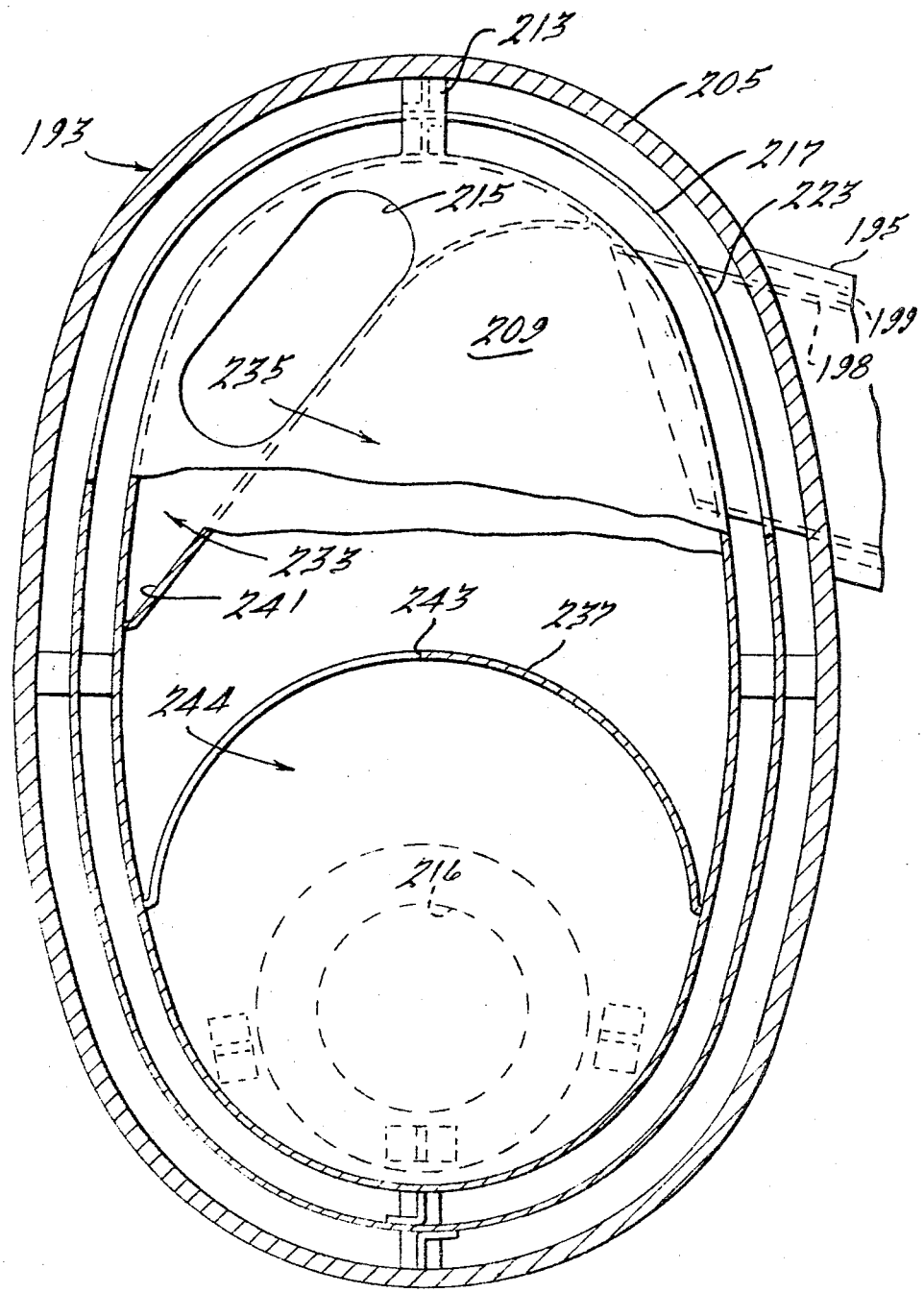

United States Patent Office 3,398,524
Patented Aug. 27, 1968

1

3,398,524
ROTARY ENGINE WITH AFTERBURNER
Maurice B. Leising, Clawson, and John J. Lenosky, Detroit, Mich., assignors to Chrysler Corporation, Highland Park, Mich., a corporation of Delaware
Filed Jan. 27, 1967, Ser. No. 612,273
10 Claims. (Cl. 60—29)

ABSTRACT OF THE DISCLOSURE

A rotary internal combustion engine in which the exhaust products are delivered through the exhaust port to a reactor chamber or after burner from which the combustion products pass in a path extending around the reactor chamber to the exhaust pipe to form an insulating layer or blanket around the reactor chamber.

Background of the invention

This invention relates generally to rotating combustion engines of the type shown in U.S. Patent 2,988,065. There are several types of rotating combustion engines; the present invention is described in connection with, although it is not limited to, a rotary combustion engine of the type comprising an outer body having an axis, end walls axially spaced from one another, and a peripheral wall interconnecting the end walls. The inner surfaces of the peripheral wall and the end walls form a cavity within which an inner body or rotor is mounted. The inner surface of the peripheral wall is substantially parallel to the axis of the cavity and has a multi-lobed profile which is preferably an epitrochoid. The axis of the rotor is parallel to but spaced from the axis of the outer body cavity and the rotor has end faces disposed adjacent the end walls of the body. The rotor also has a plurality of circumferentially spaced apex portions, the number of apex portions being one more than the number of lobes of the epitrochoid of the inner surface.

The rotor is rotatable relative to the outer body in such a manner that the apex portions continuously engage the inner surface of the peripheral wall to form a plurality of working chambers between the rotor peripheral wall and the inner surface. These chambers vary in volume during engine operation as a result of the relative of the rotor and outer body. Rotary engines of this type include an intake port or passage in the outer body for admitting the fuel-air mixture to the chambers, an exhaust port or passage in the outer body for venting the chambers, and suitable ignition means so that during engine operation the working chambers of the engine have a cycle of operation which includes the four phases of intake, compression, expansion and exhaust. As described in the aforementioned U.S. patent, this cycle of operation is achieved as a result of the relative rotation of the inner rotor and outer body. To obtain the relative rotation, both the inner rotor and outer body may rotate, or one, preferably the inner rotor, may rotate while the outer body remains stationary.

The working chambers of the engine, for efficient operation of the latter, should be sealed against leakage. In this regard, an effective seal should be provided between each rotor apex portion and the inner surface of the peripheral wall of the outer body, as well as between the end faces of the rotor and the end walls of the body.

In prior rotary combustion engines of this type, one or more radially-movable seal strips are disposed in a groove in each apex portion of the rotor so that each adjacent pair of working chambers is sepaarted by an apex seal strip or strips. These seals should withstand the severe combustion pressures and temperatures which oc-

2 cur as each working chamber passes through the intake, compression expansion and exhaust phases of engine operation. During operation of the engine, under certain conditions, the apex seals may lift off and out of contact with the inner surface of the peripheral wall, and move radially inward. The apex seals also tend to tilt from the desired radial disposition, so that contact between a seal and the wall of the slot in which the seal is located is reduced from surface contact to a line contact. This tilting is due to the pressure differential between the gases in adjacent chambers. Any apex seal movement results in a loss of sealing action and causes leakage of gases, particularly between a working chamber in its compression phase and the adjacent working chamber in its expansion phase. As a result of this apex seal movement, the effectiveness of the seal is substantially reduced and gas leakage occurs between the working chambers so that some of the fuel-air mixture is not ignited and escapes past the seal between combustion and expansion chambers. This unburned fuel then passes directly out of the engine through the exhaust system into the atmosphere. Further, it has been demonstrated that combustion of the gas-air mixture in the combustion chamber is not complete, so that additional unburned fuel is swept out of the engine through the exhaust port as the chamber containing the remaining unburned fuel reaches the exhaust port.

The emission of unburned fuel from rotary combustion engines has presented a substantial obstacle to further development and utilization of the engines. As is well known, control and prevention of emission of unburned fuel, particularly, in combustion engines, is of paramount importance in todays society. Prior attempts at reducing the unburned fuel emission from rotary combustion engines have met with some success, but further reductions in the emission of unburned fuel are desirable.

Summary of the invention

Briefly, the apparatus of this invention comprises a rotary engine having means for permitting unburned fuel which has escaped past the sealing means to burn after the fuel has been discharged from the exhaust port or ports of the engine, thus inhibiting emission of the unburned fuel into the atmosphere.

Accordingly, one of the primary objects of this invention is to provide a rotary combustion engine having improved control of unburned fuel emission, i.e., a rotary combustion engine in which the emission of unburned fuel therefrom is decreased over prior constructions.

A more specific object of this invention is to provide a rotary combustion engine of the type described wherein unburned fuel tending to escape past the apex seals is burned prior to the exhaust thereof into the atmosphere.

A further object of this invention is to provide a rotary combustion engine having unburned fuel emission control apparatus which is economical in construction and efficient in operation.

Other objects and advantages of this invention will become apparent as the description progresses.

Description of the drawings

In the accompanying drawings, in which one of varous possible embodiments are illustrated:

FIG. 1 is a schematic, elevational view of a rotary combustion engine embodying this invention, the size of certain parts being exaggerated and other parts being shown in section for clarity;

FIG. 2 is a cross-sectional view taken on line 2—2 of FIG. 1;

FIG. 4 is a cross-sectional view taken on line 4—4 of FIG. 2; and

FIG. 5 is a fragmentary end view looking in the direction of arrow 5 in FIG. 2.

Description of the preferred embodiment

Figure 3:
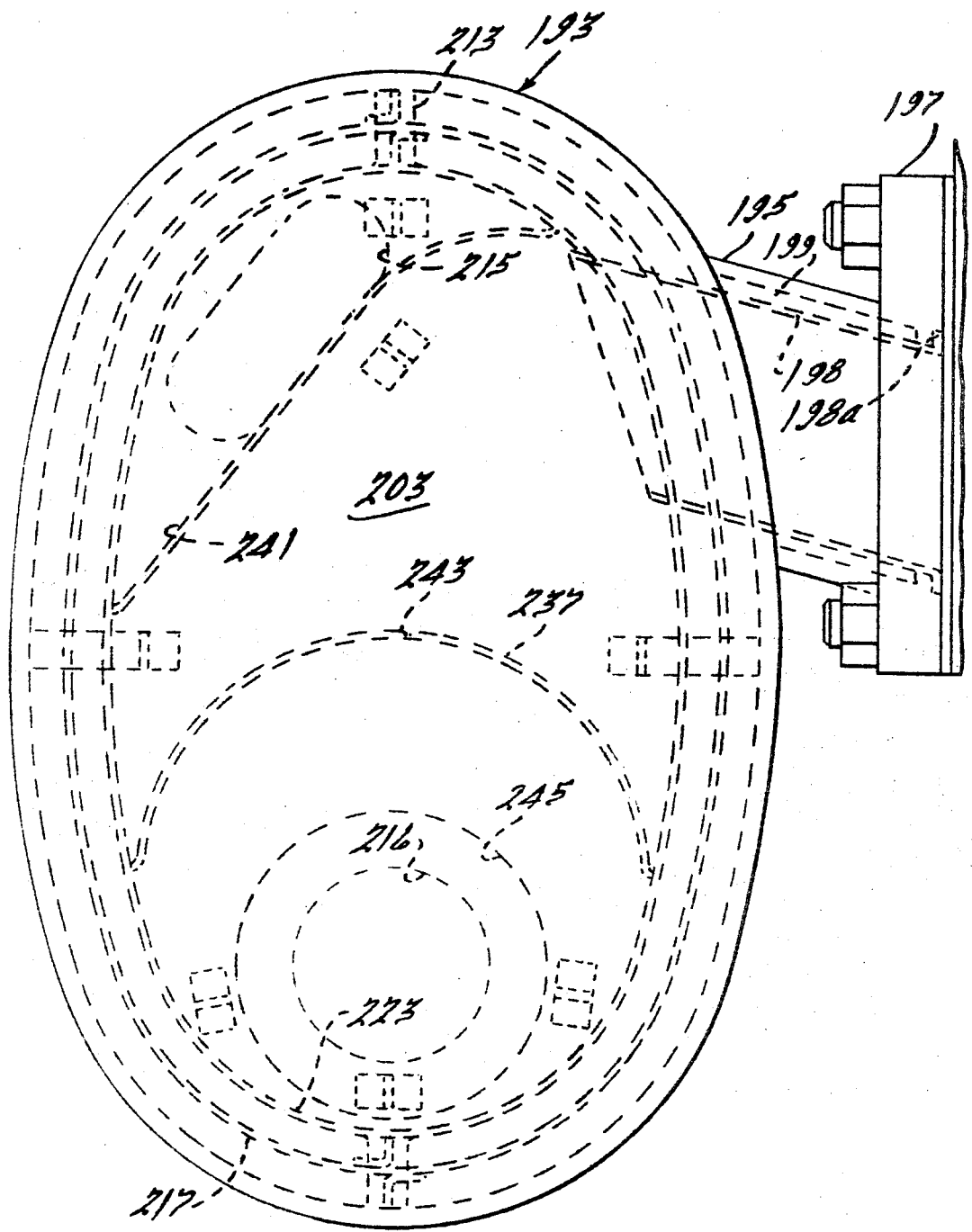
FIG. 3 is an end view of the structure of FIG. 2.

Referring now to the drawings, a rotary mechanism of this invention in the form of an internal combustion engine is generally indicated at 1. Basically, it comprises an outer body or block 3, an inner body or rotor 5 having seal means 7 for sealing apex portions 9 against the inner surface of block 3, an intake port 11, and a reactor or after burner 13 for burning unburned fuel which is forced past the apex seals 7.

More specifically, outer body 3 has axially spaced end walls 25 (only the far one of which is seen in FIG. 1) and an inner peripheral wall 29 extending therebetween to form a cavity 31. Only one cavity 31 is shown in the body 3 illustrated herein, but it will be understood that the engine may be constructed with a plurality of cavities therein located side-by-side, if desired. In fact, the reactor 13 shown herein is designed for attachment to a body 3 having two cavities 31 located side-by-side. When the engine is viewed in a plane extending transversely to the central axis 39 of the cavity 31, the peripheral wall 29 of cavity 31 has a multi-lobed profile which preferably is basically an epitrochoid, and preferably has two lobes.

A shaft 41, coaxial with the axis 39, extends through the outer body and is journaled in bearings (not shown) carried by the end walls 25. The shaft 41 has an eccentric portion 47 on which rotor 5 is journaled. Rotor 5 has axially spaced end faces 51 (only the near one of which is seen) disposed adjacent the outer body end walls 25 of block 3. As mentioned previously, rotor 5 also has a plurality of circumferentially spaced apex portions 9 which, as set forth in the aforementioned patent, are one more in number than the number of lobes in the cavity 31. The apex seals coact with peripheral wall 29 and end walls 25 to define a plurality of transient working chambers 65 which vary in volume upon rotation of the rotor 5 relative to the outer body 3. The geometrical axis of the rotor is offset from, and disposed to, the axis 39 of the outer body.

In the engine illustrated, it is to be assumed that the outer body 3 is stationary while the inner body of rotor 5 rotates within the outer body. In order to maintain the motion of the rotor 5 relative to the stationary outer body 3, an internal gear (not shown) is secured to the inner rotor 5 and is disposed in known manner in meshing engagement with a gear 69 fixed to the bearing journaled in the far end wall 25 of outer body 3. The fixed gear 69 is coaxial with shaft 41.

As described previously, the outer body 3 has intake port means 11 in end walls 25 for supplying an intake charge of fuel to the working chambers 65 and exhaust port means 73 for discharging the exhaust gases from the engine. Ignition means, shown in the form of a spark plug 75, are provided to ignite the intake charge. As viewed in FIG. 1, the rotor 5 moves in a clockwise direction so that each apex portion 9 moves successively past the intake ports 11, the spark plug 75, and the exhaust port 73.

The engine so far described is similar to the engine disclosed in the aforementioned United States Patent No. 2,988,065; reference may be made to that patent for a more detailed description of the engine.

Reactor or after burner 13 comprises an outer body or can 193 having a generally elliptical cross-section. One or more pipes 195 extend between can 193 and the exhaust port or ports 73. As shown herein, reactor 13 has two pipes 195 and is adapted to be connected to a body 3 having two cavities 31 located in side-by-side relationship. The tubes 195 have annular flanges 197 which are suitably clamped to body 3 and an inner tube or line 198 is positioned concentrically within each pipe 195 with a flange portion 198a of each tube seating in a countersunk rim portion at the engine end of each pipe. Pipes 195 and tubes 198 are maintained in spaced relation to provide an insulating dead air space 199 therebetween.

Can 193 comprises generally elliptical end walls 201 and 203 welded to an elongated shell or side wall 205.

Separator or baffle plates 207 and 209 are spaced inwardly from walls 201 and 203, respectively, by L-shaped spacer tabs 211, and are of the same general shape, only smaller, as the end walls 201 and 203. The edges of the generally elliptical portions of separator plates 207 and 209 are maintained approximately equidistant from the inside of shell 205 by fingers 213 extending from the plates to the shell. An elongated opening 215 is provided in the upper portion of plate 209 and a circular hole 216 is provided in the lower portion of plate 207.

An open-ended internal separator shell or can 217 of elliptical form is located within outer shell 205 and spaced therefrom by L-shaped spacer tabs 219. The length of shell 217 is less than the distance between separator plates 207 and 209 so the end edges of the shell 217 are located inwardly in an axial direction from the separator plates. Further, the distances between opposite sides of shell 217 are greater than the distance between opposite edges of each separator plate as will be seen in FIG. 2.

An enclosed can 221 is mounted inside shell 217 and separator plates 207 and 209. Can 221 is also elliptical in cross-section. It includes a shell or side wall 223 spaced and separated from shell 217 by spacer tabs 225 connected to the inside of shell 217. End plates 227 and 229 are connected by welding, for example, to shell 217 and are maintained in spaced relationship to separator plates 207 and 209 by spacer tabs 231 secured to plates 207 and 209. End plate 229 has a portion thereof cut out as indicated at 233 so that the interior of the can 221 is in communication with the space between end plate 229 and separator plate 209.

A first or reactor chamber 235 is formed within can 221 by an elongated semi-circular baffle plate 237, a chamber end plate 239, and a cover plate 241. Baffle plate 237 extends from end plate 229 to a point near, but spaced from, end plate 227. End plate 239 has a semi-circular lower edge fitting over baffle plate 237 and spaced from end plate 229 by a distance sufficient to insure that all of the tubes 198 open into chamber 235 between end plates 229 and 239. Connector tubes 198 pass sealingly through openings in shells 205, 217 and 223 into the reactor chamber 235. End plate 239 has an edge contour similar to the edge contour of end plate 229 adjacent the cut-out 233. Cover 241 extends axially between end plates 229 and 239; when viewed in transverse section in FIG. 4, cover 241 extends from the upper right inside surface of can 221 downwardly along the curved, matching edge contours of plates 229 and 239 to the middle left inside surface of can 221. An arcuate portion of baffle plate 237 is removed adjacent end plate 229 to provide an opening 243 placing reactor chamber 235 in communication with a second chamber 244 defined within can 221 below baffle plate 237. Opening 243 is on the other side of the longitudinal center line of the reactor from connector tubes 195.

End wall 201 of the outside cylinder 193 has an opening 245 therein which communicates with an exhaust pipe 247 secured to end wall 201 by a fitting 249. It will be seen that the construction of reactor 13 creates a tortuous path, as traced by the arrows in FIG. 2 for the unburned fuel emitted from exhaust ports 73. The purpose of this path is to facilitate combustion in sub-chamber 235, and to a lesser extent in sub-chamber 244, of the unburned fuel emitted from the exhaust ports.

Operation of the apparatus of this invention is as follows:

Assuming the rotor 5 is in the position shown in FIG. 1, a fuel-air mixture is admitted into the cavity 31 through the port 11. The fuel-air mixture in the chamber adjacent ports 11 is then compressed as the rotor moves in a clockwise direction until the peripheral portion of the rotor which was originally adjacent the intake port 11 is adjacent the spark plug 75. In this position the fuel-air mixture is in maximum compression. Plug 75 is now fired to commence the expansion phase of the cycle; as the fuel and air mixture expands, the rotor is turned further clockwise by the expansion so that exhaust port 73 is eventually exposed to allow the exhaust products to be vented to reactor 13. During this operational cycle, seals 7 tend to lift off of wall 29 due to pressure differentials between the gases in adjacent chambers, thereby allowing gas leakage between these chambers. This leakage is particularly intense between a working chamber in its compression phase and the adjacent working chamber in its expansion phase. As a result, significant quantities of unburned fuel escape into the working chamber in its expansion phase and thence, during the ensuing exhaust phase, out of exhaust port 73. Additional unburned fuel is swept out of the exhaust port as a result of incomplete combustion in the combustion chamber.

Since at least one working chamber is always exhausting to port 73, a substantially continuous supply of hot exhaust products is delivered through the exhaust port so that the exhaust port and adjacent structure are maintained at a relatively constant and relatively high temperature during operation of the engine. Reactor 13 facilitates combustion of the unburned fuel and air mixture escaping from each cavity 31 through the related exhaust port 73.

The unburned fuel and air mixture passes from ports 73 through connector tubes 198 into the chamber 235 formed by shell 223, end plate 239, baffle plate 237 and cover 241. It will be understood that the temperature of the unburned fuel and air mixture is very high since it has just been discharged from the engine where combustion of most of the fuel and air mixture has taken place. If the fuel and air mixture discharged from exhaust ports 73 is in a large enough space and prevented from cooling too rapidly, it will continue to burn even after it is discharged from the outer body 3 of the engine, thus reducing the amount of unburned fuel which will be emitted into the atmosphere. The reactor chamber 235 provides ample space for continued combustion of the fuel, and as made apparent hereinafter, the path of the materials of combustion after leaving chamber 235 creates an insulation or blanket around the chamber and maintains the high temperatures necessary for continued combustion in the chamber. Thus the unburned fuel entering chamber 235 continues to burn.

The exhaust products in chamber 235 pass therefrom through opening 243 in baffle plate 237 into chamber 244 in the lower area of can 221. The exhaust products entering chamber 235 through the left tube 198 (as seen in FIG. 2) pass laterally rightward in chamber 235 and thereafter swirl downwardly through opening 243; the exhaust products entering chamber 235 through right tube 198 are deflected by cover 241 directly downward in a swirling pattern into opening 243. The swirling nature of the entry pattern of the exhaust products entering lower chamber 244 imparts a swirling action to the exhaust products within chamber 244. The exhaust products flow laterally in a swirling pattern leftward within chamber 244 to the left end of can 221. After reaching the left end of can 221, the exhaust products pass around the end of baffle plate 237 and move upwardly toward the top of can 221, whereafter they move laterally rightward through the narrow elongated passage 250 defined between the upper face of cover 241 and the inner surface of the adjacent wall portion of shell 223. The exhaust products are discharged from the right-hand end of can 221 through the cut-out 233 in end plate 229. A portion of the exhaust products impinge on separator plate 209 around opening 215 and are deflected toward the sides of that plate between it and end plate 229 of can 221. Another portion of the exhaust products passing through cut-out 233 passes through opening 215 in separator plate 209 and impinges on end wall 203, which deflects the exhaust products toward the sides of separator plate 209 between the latter and end wall 203.

When the exhaust products deflected by the separator plate 209 and end wall 203 reach the edges of can 221 and separator plate 209, respectively, they combine and flow laterally leftward along the reactor in the elongated annular passages defined between shells 223 and 217, and between shells 217 and 205. Upon reaching the left-hand end of the reactor 13, the exhaust products pass between end plate 227 and separator plate 207, and between separator plate 207 and end wall 201, to hole 216 and opening 245, respectively. The exhaust products are then discharged through exhaust pipe 247. It will be seen that the several layers of exhaust products surrounding chamber 235, i.e., the layer of exhaust products within can 221, the layer of exhaust products between can 221, shell 217 and separator plates 207 and 209, and the layer of exhaust products between shell 217, separator plates 207 and 209, and reactor cylinder shell 205 and end walls 201 and 203, are in effect multiple layers of insulation which reduce heat transfer from the chamber 235 to the atmosphere. Thus the high temperatures necessary for continued combustion of unburned fuel discharged from exhaust ports 73 are maintained within chamber 235. Shell 217 acts as a radiation shield between inner can wall 223 and outer can wall 205; separator plates 207 and 209 similarly act as radiation shields between can ends 229 and 203, and 201 and 227, respectively.

On recent tests of a rotary combustion engine constructed in accordance with this invention and a rotary combustion engine which did not have the reactor of this invention, it was found that the engine constructed in accordance with this invention produced a hydrocarbon emission, which was significantly lower than the hydrocarbon emission of the rotary combustion engine without the invention reactor.

It will be seen that the apparatus of this invention reduces the unburned fuel-air mixture emission, thereby increasing the acceptability of this type of rotary combustion engine.

In view of the foregoing it will be seen that the several objects and advantages of this invention are attained.

It will be understood that the invention is not to be limited to the exact constructions shown and described, but that various changes and modifications may be made without departing from the spirit and scope of the invention, as defined by the appended claims.

We claim:

1. A combustion system comprising
   (A) an engine block defining an internal cavity having a closed peripheral wall;
   (B) a rotor mounted for rotation within said cavity and having a plurality of apexes sealingly engaging said wall to define therewith a plurality of working chambers;
   (C) an intake port in said block for delivering a charge of fuel and air to each of said chambers as the latter move successively past said port;
   (D) means within said cavity for successively igniting each of said charges as said chambers move successively therepast;
   (E) an exhaust port in said block for receiving the exhaust products from each of said chambers as the latter move successively therepast, whereby a substantially continuous supply of exhaust products is exhausted through said exhaust port;
   (F) a reactor chamber communicating with said exhaust port to receive the continuous supply of exhaust products therefrom and having an outlet; and
   (G) conduit means communicating with the outlet of said reactor chamber and extending around said reactor chamber to an outlet for connection to the exhaust pipe of said combustion system, whereby unburned fuel in said exhaust products is oxidized in said reactor chamber and the exhaust products pass therefrom through said conduit means to form an insulating blanket around said reactor chamber to facilitate the oxidation process occurring therein.

2. A combustion system according to claim 1 wherein
(H) said reactor chamber is defined within an elongated can including an end wall at each end thereof;
(I) said conduit means includes an elongated annular chamber surrounding said elongated can;
(J) an outlet is formed in one of the end walls of said can to provide communication between said reactor chamber and said annular chamber; and
(K) said conduit means outlet is provided adjacent the other end wall of said can.

3. A combustion system according to claim 2 wherein
(L) said elongated can comprises a first, relatively small can;
(M) said annular chamber is defined between the external periphery of said first can and the internal periphery of a second relatively large can closed at both ends and housing said first can therewithin with one end of said second can in axially spaced relation to said one end of said first can and the other end of said second can in axially spaced relation to the other end of said first can;
(N) said conduit means outlet is provided by an opening in said other end wall of said second can; and
(O) said exhaust port extends sealingly through the spaced peripheral walls of said cans for communication with said reactor chamber.

4. A combustion system according to claim 3 and further including
(Q) a third can open at both ends and positioned between the spaced peripheral walls of said first and second cans.

5. A combustion system according to claim 4 and further including
(R) a baffle positioned between the said one end walls of said first and second cans and another baffle positioned between the said other end walls of said cans.

6. A combustion system according to claim 2 and further including
(L) means within said can dividing the interior of the can into at least a first and second chamber
(1) said first can chamber constituting said reactor chamber communicating with said exhaust port with said reactor chamber outlet communicating with said second can chamber,
(2) said second can chamber communicating with said outlet in said one end wall of said can and constituting together with said annular chamber, said conduit means.

7. A combustion system according to claim 6 wherein
(M) one axially extending wall of said first chamber is spaced from the adjacent wall portion of the side wall of said can to provide an elongated axially extending passage therebetween communicating at one end with said outlet in said one end wall of said can;
(N) an opposite axially extending wall of said first chamber is spaced from the adjacent side wall portion of said can to provide a second axially extending chamber within said can;
(O) said second chamber is isolated from said can outlet; and
(P) said second chamber communicates with the other end of said passage adjacent said other end wall of said can.

8. A combustion system according to claim 7 wherein
(Q) the outlet in said first chamber is adjacent said one end wall of said can so that the exhaust products from said exhaust port pass through said first chamber, exit therefrom adjacent said one end wall of said can, flow axially of said can within said second chamber to said other end wall of said can, flow transversely of said can adjacent said other end wall to said passage, flow axially of said can within said passage to exit from said can of said outlet in said one end wall, and thereafter flows axially through said annular chamber for exit at said conduit means outlet.

9. A combustion system according to claim 8 wherein
(R) said elongated can comprises a first relatively small can;
(S) said annular chamber is defined between the external periphery of said first can and the internal periphery of a second relatively large can closed at both ends and housing said first can therewithin with one end of said second can in axially spaced relation to said one end of said first can and the other end of said second can in axially spaced relation to the other end of said first can;
(T) said conduit means outlet is provided by an opening in said other end wall of said second can; and
(U) said exhaust port extends sealingly through the spaced peripheral walls of said cans for communication with said reactor chamber.

10. A combustion system according to claim 9 and further including
(V) a third can open at both ends and positioned between the spaced peripheral walls of said first and second cans.

References Cited

UNITED STATES PATENTS

| | | |
|---|---|---|
| 1,255,403 | 2/1918 | Gardner. |
| 2,988,065 | 6/1961 | Wankel. |
| 3,302,394 | 2/1967 | Pahnke _____ 60—30 |

RALPH D. BLAKESLEE, *Primary Examiner.*

UNITED STATES PATENT OFFICE
CERTIFICATE OF CORRECTION

Patent No. 3,398,524　　　　　　　　　　　　　　　　August 27, 1968

Maurice B. Leising et al.

It is certified that error appears in the above identified patent and that said Letters Patent are hereby corrected as shown below:

Column 1, line 46, after "tive" insert -- rotation --.

Signed and sealed this 17th day of March 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents